US008922592B2

(12) United States Patent
Hirose et al.

(10) Patent No.: US 8,922,592 B2
(45) Date of Patent: Dec. 30, 2014

(54) MAP DISPLAY DEVICE, MAP DISPLAY METHOD, MAP DISPLAY PROGRAM, AND COMPUTER-READABLE RECORDING MEDIUM

(75) Inventors: Chihiro Hirose, Kawagoe (JP); Yozo Takehara, Tokyo (JP)

(73) Assignee: Pioneer Corporation, Tokyo (JP)

( * ) Notice: Subject to any disclaimer, the term of this patent is extended or adjusted under 35 U.S.C. 154(b) by 956 days.

(21) Appl. No.: 13/063,879

(22) PCT Filed: Nov. 30, 2009

(86) PCT No.: PCT/JP2009/070139
§ 371 (c)(1),
(2), (4) Date: Mar. 14, 2011

(87) PCT Pub. No.: WO2011/064895
PCT Pub. Date: Jun. 3, 2011

(65) Prior Publication Data
US 2011/0249030 A1   Oct. 13, 2011

(51) Int. Cl.
G09G 5/00 (2006.01)
G06F 3/048 (2013.01)
G09B 29/00 (2006.01)
G01C 21/36 (2006.01)
G06F 3/0488 (2013.01)
G06T 17/05 (2011.01)
G09B 29/10 (2006.01)

(52) U.S. Cl.
CPC .......... *G09B 29/003* (2013.01); *G01C 21/3638* (2013.01); *G01C 21/3664* (2013.01); *G06F 3/0488* (2013.01); *G06T 17/05* (2013.01); *G09B 29/10* (2013.01)
USPC .......................................... 345/650; 345/676

(58) Field of Classification Search
CPC .. G09B 29/003; G01C 1/3638; G01C 1/3664; G06F 3/017; G06F 3/0485; G06F 3/048; G09G 5/00
USPC .......................................... 345/650, 621, 676
See application file for complete search history.

(56) References Cited

U.S. PATENT DOCUMENTS 4,790,028 A * 12/1988 Ramage ........................ 382/298
2004/0169653 A1* 9/2004 Endo et al. ..................... 345/427
(Continued)

FOREIGN PATENT DOCUMENTS

JP      06-282378      10/1994
JP      2006-330428    12/2006
(Continued)

OTHER PUBLICATIONS

Google Earth User Guild for Version 4.0, Google Earth 4.0 Release Date Jun. 11, 2006, pp. 1-133.*

(Continued)

*Primary Examiner* — Kee M Tung
*Assistant Examiner* — Yuehan Wang
(74) *Attorney, Agent, or Firm* — Young & Thompson (57) ABSTRACT

A map display apparatus includes a display that displays a map viewed at a given angle for bird's eye view with respect to the ground; a touch panel that is disposed on the display; a determining unit that determines strength of touch of an object on the touch panel; a display controller that controls a display format of the map displayed on the display, based on a result of determination by the determining unit, where the display controller scrolls the map when the strength of touch is at most a given strength, and changes the angle for bird's eye view when the strength of touch exceeds the given strength.

6 Claims, 10 Drawing Sheets

(56) References Cited

U.S. PATENT DOCUMENTS

| | | | |
|---|---|---|---|
| 2006/0026521 A1* | 2/2006 | Hotelling et al. | 715/702 |
| 2009/0150775 A1 | 6/2009 | Miyazaki et al. | |
| 2009/0160793 A1* | 6/2009 | Rekimoto | 345/173 |
| 2010/0309228 A1* | 12/2010 | Mattos et al. | 345/654 |
| 2011/0050588 A1* | 3/2011 | Li et al. | 345/173 |

FOREIGN PATENT DOCUMENTS

| | | |
|---|---|---|
| JP | 2007-034101 | 2/2007 |
| JP | 2007-094708 | 4/2007 |
| JP | 2007-192881 | 8/2007 |
| JP | 2007-328570 | 12/2007 |
| JP | 2009-140368 | 6/2009 |
| JP | 2009-157908 | 7/2009 |

OTHER PUBLICATIONS

International Search Report/ PCT/JP2009/070139, Feb. 9, 2010.

* cited by examiner

MAP DISPLAY DEVICE, MAP DISPLAY METHOD, MAP DISPLAY PROGRAM, AND COMPUTER-READABLE RECORDING MEDIUM

TECHNICAL FIELD

The embodiments discussed herein are related to a map display device, a map display method, a map display program for displaying map data, and a computer-readable recording medium. However, application of this invention is not limited to the map display apparatus, the map display method, the map display program, and the computer-readable recording medium.

BACKGROUND ART

When map data is displayed on a navigation apparatus, a known technology switches the display format of the map data from a plan view to an overhead view as an operation knob of an operation bar is moved upward and downward (see for example, Patent Document 1 below). According to Patent Document 1, when the operation knob is at the top of the map operation bar, a road map in plan view is displayed. As the operation knob in the map operation bar is moved downward, the display format of the map is switched from the plan view map to an overhead view map and the overhead view map is displayed. As the operation knob is moved further downward, an angle for looking down or the height of vantage point for the overhead view map is changed and a map area ahead is displayed. When the operation knob is at the bottom of the operation bar, the overhead view map is displayed.

An information processing apparatus with a touch screen input device is also known that distinguishes between two touch-level forces and processes each touch-level as different inputs (see Patent Document 2 below).

Patent Document 1: Japanese Laid-Open Patent Application Publication No. 2007-192881
Patent Document 2: Japanese Laid-Open Patent Application Publication No. H06-282378

DISCLOSURE OF INVENTION

Problem to be Solved by the Invention

However, according to Patent Document 1, the display format of the map data is changed using the operation bar. As a result, the operation bar must be displayed on the screen and thus one problem is that the area for displaying the map data becomes smaller. For instance, a navigation apparatus installed on a mobile object or a mobile information processing apparatus has a limitation in the size of the display screen. When the presence of the operation bar further reduces the region for displaying the map data, it becomes difficult to obtain necessary information, which increases the chance of causing inconvenience to users.

Means for Solving Problem

In order to solve the problems and to achieve objectives, a map display apparatus described in claim 1 includes a display that displays a map viewed at a given angle for bird's eye view with respect to the ground, a touch panel that is disposed on the display, a determining unit that determines strength of touch of an object on the touch panel, a display controller that controls a display format of the map displayed on the display based on a result of the determination of the determining unit, wherein the display controller scrolls the map when the strength of touch is at most a given strength, and changes the angle for bird's eye view when the strength of touch is larger than the given strength.

A map display method described in claim 6 is a method for a map display apparatus including a display and a touch panel disposed on the display, and includes displaying on the display a map viewed at a given angle for bird's eye view with respect to ground, determining strength of touch of an object on the touch panel, controlling a display format of the map displayed on the display based on a result of the determination in the determining, wherein in the controlling, the map is scrolled if the strength of touch is at most a given strength, and the angle for bird's eye view is changed if the strength of touch is larger than the given strength.

A map display program described in claim 7 causes a computer to perform the map display method according to claim 6.

A computer-readable recording medium described in claim 8 stores therein the map display program according to claim 7 in a computer-readable manner.

BEST MODE(S) FOR CARRYING OUT THE INVENTION

With reference to the accompanying drawings, preferred embodiments of a map display apparatus, a map display method, a map display program, and a computer-readable recording medium according to the present invention will be explained.

Embodiment

Figure 1:
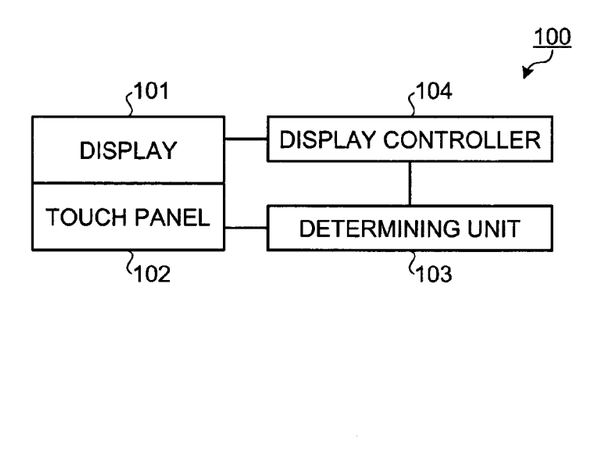
FIG. 1 is a block diagram depicting a functional structure of a map display apparatus according to one embodiment.

FIG. 1 is a block diagram depicting a functional structure of a map display apparatus according to one embodiment. A map display apparatus 100 according to one embodiment includes a display 101, a touch panel 102, a determining unit 103, and a display controller 104.

The display 101 displays a map observed at a predetermined angle with respect to the ground, for a bird's eye view.

The angle for the bird's eye view may be defined arbitrarily but in this embodiment, the angle for bird's eye view is defined to be an angle between the ground and a segment connecting a vantage point and a reference point when the reference point on the ground is observed from the vantage point at a predetermined height from the ground (namely, when the reference point on the ground is viewed from above). The display 101 displays the ground surface tilted (the inclination angle being changed) about the reference point on the display 101 when displaying a bird's eye view where the ground is viewed from above.

Figure 2:
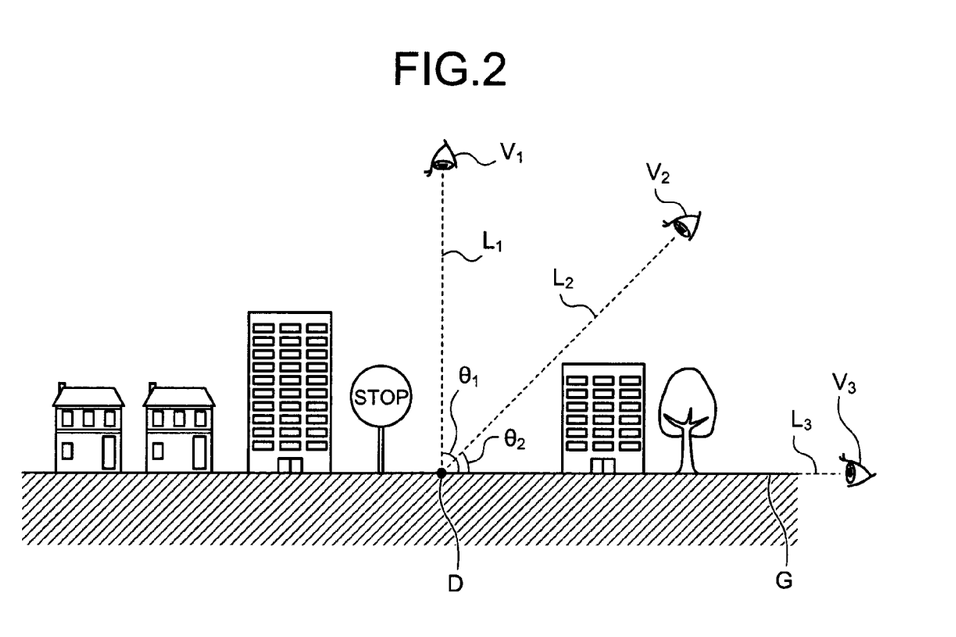
FIG. 2 is a diagram depicting one example of an angle for a bird's eye view in the map display apparatus.

FIG. 2 is a diagram depicting one example of the angle for bird's eye view in the map display apparatus. In FIG. 2, features such as buildings, houses, and signposts are present on the ground G. For instance, when a vantage point is at $V_1$, an angle between the ground G and a segment $L_1$ connecting the vantage point $V_1$ and a reference point D is denoted by $\theta_1$. $\theta_1$ is about 90°. Similarly, when the vantage point is at $V_2$, an angle between the ground G and a segment $L_2$ connecting the vantage point $V_2$ and the reference point D is denoted by $\theta_2$, where $\theta_2 < \theta_1$. When the vantage point is at $V_3$, an angle between the ground G and a segment $L_3$ connecting the vantage point $V_3$ and the reference point D is almost equal to 0°. The vantage point $V_3$ is a vantage point near the ground and for example, approximately equal to the height of a vantage point of a pedestrian or a driver of a vehicle. Generally, a map of an area as viewed from the vantage point $V_1$ to the ground (reference point) is referred to as plan view, a map of an area as viewed from the vantage point $V_2$ to the ground (reference point) is referred to as bird's eye view, and a map of an area as viewed from the vantage point $V_3$ to the ground (reference point) is referred to as driver's view. Therefore, "a map viewed from a given angle with respect to the ground" includes a map viewed from a vantage point between $V_1$ and $V_3$.

Let us return to FIG. 1. The touch panel 102 is disposed on the display 101 and is used, for example, to receive input for the map display apparatus 100. Specifically, for example, the display 101, to receive input, displays operation buttons that the user touches (contacts) to input a desired location.

The determining unit 103 determines with how much force an object is touching the touch panel. The object is, for example, a hand or a finger of the user. The determining unit 103 determines the strength of touch of the object by at least two levels (for instance, whether the strength of touch of the object is more than a given strength, or is the given strength or less).

The display controller 104 controls a display format of a map to be displayed on the display 101, based on a result of the determination by the determining unit 103. Specifically, the display controller 104 scrolls the map when the strength of touch is the given strength or less, and changes the angle for bird's eye view when the strength of touch exceeds the given strength. When the map is scrolled, the display controller 104 scrolls map data, for example, in a direction from a central point of a currently displayed map toward a contact point of the object within an upper region of the touch panel 102 (display 101).

When the angle for bird's eye view is changed, the display controller 104 reduces the angle for bird's eye view if, after the ground surface in a map is tilted, the object touches a region of the touch panel 102 displaying a portion of the map farther away from a user with respect to the reference point. In other words, when the object touches a portion of the map farther in the distance with respect to the reference point, a view of a map to be displayed is brought closer to the driver's view. On the other hand, after the ground surface in a map is tilted, if the object touches a region of the touch panel 102 displaying a portion of the map nearer to the user with respect to the reference point, the display controller 104 increases the angle for bird's eye view. In other words, when the object touches a portion of the map in the forefront with respect to the reference point, a view of the map is brought closer to the plan view.

When changing the angle for bird's eye view, the display controller 104 may also accelerate the rate of change in the angle for bird's eye view in proportion to the distance between the reference point and the contact point of the object with the touch panel 102. In this case, if a user wishes to greatly change the angle for bird's eye view, the user touches a point farther from the reference point on the touch panel 102. If the user wishes to change the angle for bird's eye view a little, the user touches a point relatively closer to the reference point on the touch panel 102. In this way, the angle for bird's eye view is changed efficiently.

The display controller 104 may also continue to scroll the map or change the angle for bird's eye view while the object maintains contact with the touch panel 102. In this case, the display controller 104 may accelerate the scroll speed instead of changing the angle for bird's eye view even when the strength of touch becomes larger than the given strength during the scroll of the map. The display controller 104 may also continue the scroll, neglecting the change of the strength of touch even when the strength of touch exceeds the given strength during the scroll of the map.

Figure 3:
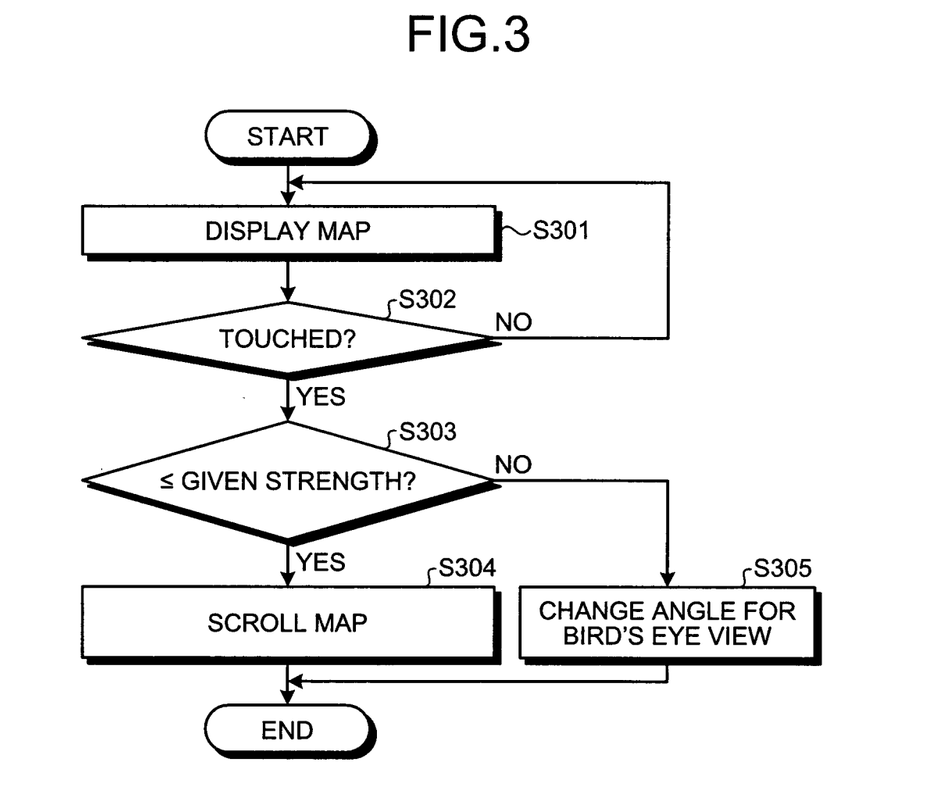
FIG. 3 is a flowchart depicting a map display process by the map display apparatus.

FIG. 3 is a flowchart depicting a procedure of a map display process according to the map display apparatus. In the flowchart of FIG. 3, the map display apparatus 100 displays on the display 101, a map viewed from a given angle for bird's eye view with respect to the ground (step S301). The displayed map is map viewed from an angle for bird's eye view between the above vantage points $V_1$ and $V_3$. The map display apparatus 100 determines whether an object has touched the touch panel 102 (step S302). If an object has not touched the touch panel 102 (step S302: NO), the process returns to step S301 and continues to display the map.

If the object touches the touch panel 102 (step S302: YES), the map display apparatus 100, using the determining unit 103, determines the strength of touch of the object and determines whether the strength of touch is at most the given strength (step S303). If the strength of touch is the given strength or less (step S303: YES), the map display apparatus 100 scrolls the map displayed on the display 101 (step S304), terminating the process of this flowchart. If the strength of touch is not the given strength or less (is larger than the given strength) (step S303: NO), the map display apparatus 100 changes the angle for bird's eye view of the displayed map (step S305), terminating the process of this flowchart.

As explained above, the map display apparatus 100 determines the strength of touch of the object with respect to the touch panel 102, scrolls the map if the strength of touch is the given strength or less, and changes the angle for bird's eye view if the strength of touch is larger than the given strength. In this way, an interface for changing the angle for bird's eye view of the bird's eye view is not required, and a display area of the display 101 and other operation devices can be efficiently used.

Further, the map display apparatus 100 can receive two kinds of input corresponding to a strong or a weak touch of the touch panel 102. The strength of touch with respect to the touch panel 102 can be easily changed as compared with other operations (for example, pushing one of two buttons). Thus, even if the map display apparatus 100 is mounted on a mobile object such as a vehicle, operations do not affect the vehicle's movement.

Further, the map display apparatus 100 continues to scroll the map or change the angle for bird's eye view while the object touches the touch panel 102. In this way, operations such as largely changing the angle for bird's eye view or the displayed area of the map and continuously changing the angle for bird's eye view or the displayed area of the map are easily performed. Further, the map display apparatus 100 accelerates the scroll if the strength of touch exceeds a given strength during the scroll. This is because a user has a tendency to press the touch panel 102 harder when the user feels that the current speed of the scroll is slow. Changing the scroll speed based on the strength of touch enables intuitive scrolling.

Further, the map display apparatus 100, when changing the angle for bird's eye view, reduces the angle for bird's eye view if the object touches a portion of the map farther in the distance with respect to the reference point, and increases the angle for bird's eye view if the object touches a portion of the map more in the forefront with respect to the reference point. In this way, the angle for bird's eye view can be controlled intuitively and a user can easily adjust the angle for bird's eye view.

Further, when changing the angle for bird's eye view, the map display apparatus 100, in proportion to the distance between the reference point and a point where the object touches the touch panel, changes the rate at which the angle for bird's eye view changes. In this way, the display format is efficiently changed when the user wishes to greatly change the angle for bird's eye view.

EXAMPLE

Examples are explained below. In this example, the map display apparatus 100 according to the embodiments are used as a navigation apparatus 400 mounted on a vehicle.
(Hardware Configuration of the Navigation Apparatus 400)

Figure 4:
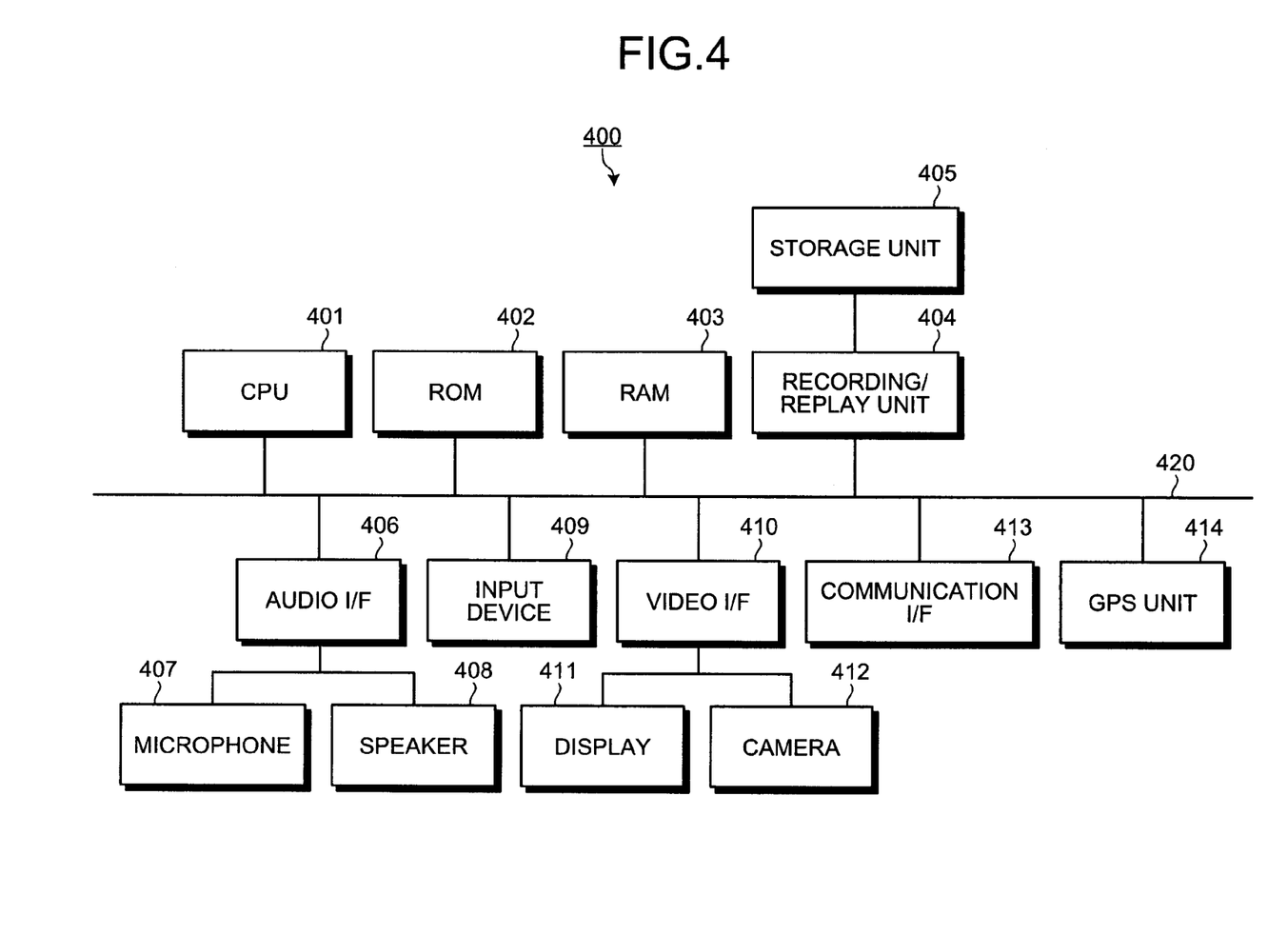
FIG. 4 is a block depicting a hardware configuration of a navigation apparatus.

FIG. 4 is a block diagram depicting a hardware configuration of the navigation apparatus. The navigation apparatus 400 according to this example includes a CPU 401, a ROM 402, a RAM 403, a recording/replay unit 404 that records/replays various data, a storage unit 405 that stores various data, an audio I/F (interface) 406, a microphone 407, a speaker 408, an input device 409, a video I/F 410, a display 411, a camera 412, a communication I/F 413, and a GPS unit 414, respectively connected by a bus 420.

The CPU 401 governs overall control of the navigation apparatus 400. The ROM 402 stores therein various programs such as a boot program, a map data displaying program, a route searching program, and a facility searching program. The RAM 403 is used as a work area of the CPU 401. Namely, the CPU 401, using the RAM 403 as a work area, executes various programs stored in the ROM 402 and governs overall control of the navigation apparatus 400.

The recording/replay unit 404 controls the reading and the writing of data with respect to the storage unit 405, under the control of the CPU 401. The storage unit 405 stores data written thereto under the control of the recording/replay unit 404. The recording/replay unit 404 is, for example, a magnetic disk drive or an optical disk drive. The storage unit 405 is, for example, a hard disk (HD), a flexible disk (FD), a flash memory, an MO, a solid state disk (SSD), or a memory card.

One example of information stored in the storage unit 405 is, for example, map data. The map data includes background data representing features such as buildings, rivers, and land surfaces, and road shape data representing the shape of roads. The map data is divided by region and into multiple data files.

The road shape data further includes traffic condition data. The traffic condition data includes information on nodes indicating whether there is a traffic light, a crosswalk, an expressway ramp, a junction, the length (distance) of a link, the width of a road, the direction of traffic flow, road type (expressway, toll road, general road).

Function data are three-dimension data representing shapes of facilities on a map, text data representing explanation of the facilities, and various data excluding the map data. The map data, the function data is divided by area or by function into blocks and stored. Specifically, for example, the map data is stored in a manner such that the map can be separated into blocks by area, each block representing an area in the map displayed on the screen. The function data is, for example, stored in a manner such that the function data can be separated into blocks by function, each block representing one function.

The function data realizes functions of, for example, program data that performs route search, calculation of time required, or route guidance in addition to functions of the three-dimension data and the text data mentioned above. Each of the map data and the function data includes multiple data files separated by area or function. In this example, the map data is stored in the storage unit but may be received, for example, via the communication I/F 413 and used in various processes.

The audio I/F 406 is connected to the microphone 407 for audio input and the speaker 408 for audio output. The audio I/F 406 D/A-converts audio data to be replayed, the audio data being output as sound from the speaker 408. The speaker 408 may be detachable from the navigation apparatus 400 and be placed far from the main unit of the navigation apparatus 400. The microphone 407 is installed, for example, near the sun visor of the vehicle, and collects the user's utterance which is output to the audio I/F 406. Sounds collected by the microphone 407 are A/D-converted in the audio I/F 406.

The input device 409 includes a remote controller, a key board, a touch panel and so on that have keys for entering characters, numeric values, and various instructions. The navigation apparatus 400 according to this example is at least equipped with a touch panel using the display 411 as the input device 409. As will be explained later, the touch panel of the navigation apparatus 400 can detect the object approaching near the surface of the display 411 as well as the object contacting the surface of the display 411, the object being, for example, a finger of the user.

The video I/F 410 is connected to the display 411 and the camera 412. The video I/F 410 includes, for example, a buffer memory such as a graphic controller that controls the display 411 and a Video RAM (VRAM) that temporarily stores immediately displayable image information, and a control IC that controls the display 411 based on image data output from the graphic controller.

The display 411 displays map data, icons, cursors, menus, windows, or various data such as text and images. The display 411 has sensors on the surface and is used as the input device 409 (touch panel) by detecting an approaching or contacting object. In this example, the display 101 and the touch panel 102 (see FIG. 1) according to the embodiments are explained as a touch panel employing the display 411.

The camera 412 captures the inside or outside of the vehicle in which the navigation apparatus 400 is mounted. The camera 412 may take pictures or movies. Images taken by the camera 412 are stored in the storage unit 405 via the video I/F 410.

The communication I/F 413 is connected to a network wirelessly enabling data communication via the network. Using the communication I/F 413, the navigation apparatus 400 can acquire map data (including update data for the map data) via the network. In other words, even if map data is not present in the storage 405, map data needed for displaying on the display 411 can be acquired from an external server. A communication network is, for example, a LAN, a WAN, a public line network, or a mobile telephone network.

The GPS unit 414 receives signals from GPS satellites and outputs information indicating the current position of the vehicle in which the navigation apparatus 400 is mounted. The GPS unit includes various sensors such as a speed sensor, an acceleration sensor, and angular speed sensor. The information output by the GPS unit 414 is used in calculation of the current position of the navigation apparatus 400. The information indicating the current position is information such as latitude, longitude, and altitude that specifies one point on a map.

Functions of each component in the map display apparatus 100 illustrated in FIG. 1 are implemented by the CPU 401 executing a program and controlling each unit with programs or data stored in the ROM 402, the RAM 403, the storage unit 405 illustrated in FIG. 4.

(Map Display Processing of the Navigation Apparatus 400)

Map display processing of the navigation apparatus 400 is explained. The navigation apparatus 400 displays map data around the current position of the vehicle when performing route guidance. The navigation apparatus 400 can also read out from the storage unit 405 map data around an arbitrary position designated by the user and display the map on the display 411.

There are various types of display format of the map data for the navigation apparatus 400. One example is a map for which the ground is viewed from a given angle for bird's eye view. As the angle for bird's eye view is changed, the display format can be changed from that close to plan view where the ground is viewed from directly above (the angle for bird's eye view being 90°) to that close to driver's view where one point on the ground is viewed from another point on the ground (the angle for bird's eye view being almost 0°).

An interface that receives changes of the angle for bird's eye view from the user may take various forms. The display 411 of the navigation apparatus 400 in the traveling vehicle displays various kinds of information such as route guide information, the distance to a destination, or a button for changing the scale of a map. Thus, if an interface for receiving changes of the angle for bird's eye view is continuously displayed on the display 411, a display area for the map becomes smaller and it is possible that a user cannot obtain necessary information immediately.

In light of this, the navigation apparatus 400 according to this example uses a pressure-sensitive type touch panel that detects the strength of touch of the object, and detects how hard the user's hand contacts the display 411. When the display 411 is touched while the map is displayed, the navigation apparatus 400 processes the input as an input for the scrolling of a displayed map if the strength of touch is a given strength or less. On the other hand, if the strength of touch is larger than the given strength, the navigation apparatus 400 processes the input as an input for the changing of an angle for bird's eye view of the map. In this way, even if an interface for receiving changes of the angle for bird's eye view is not continuously displayed, an input for changing the angle for bird's eye view can easily be received. A map is scrolled when the strength of touch is a given strength or less because touching the display 411 while a map is displayed is generally treated as an input for scrolling the displayed map.

Figure 5:
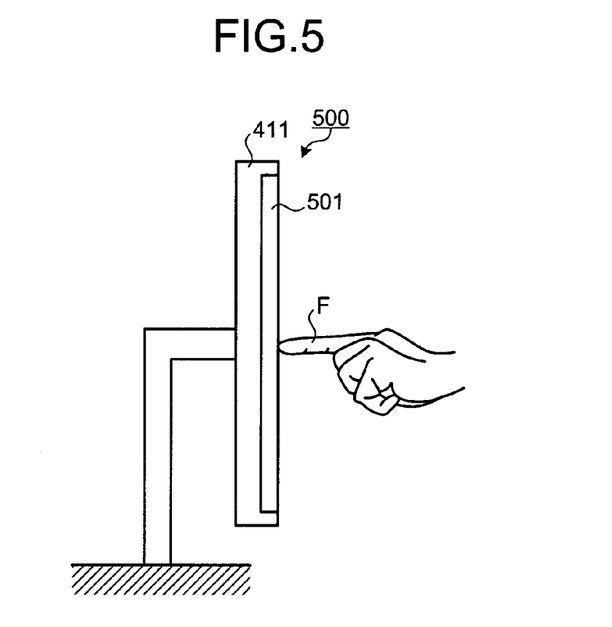
FIG. 5 is a diagram depicting a pressure-sensitive type touch panel.
Figure 6:
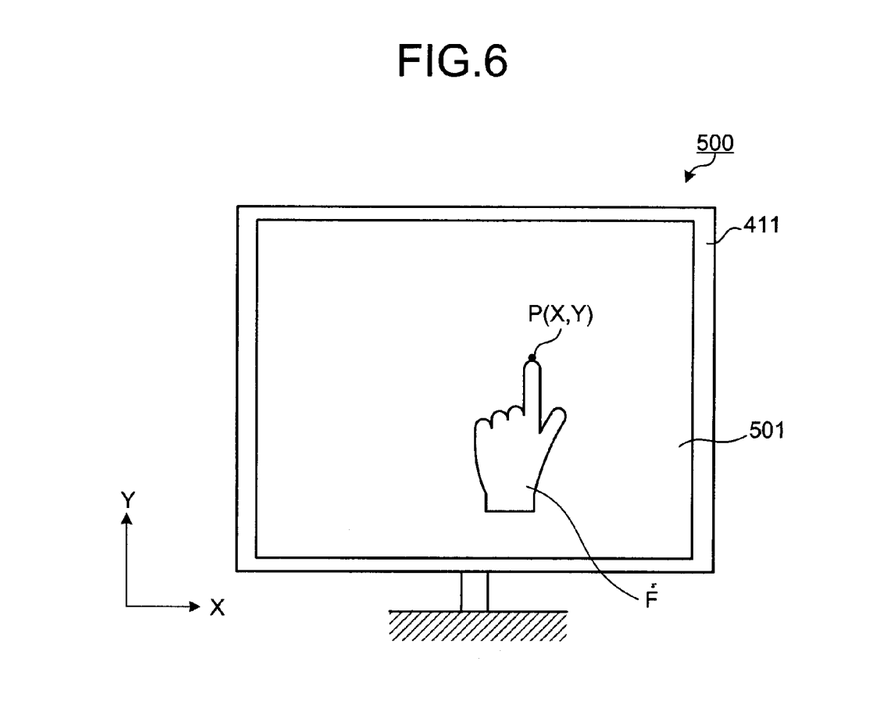
FIG. 6 is a diagram depicting a pressure-sensitive type touch panel.

FIG. 5 and FIG. 6 are diagrams depicting a pressure-sensitive type touch panel. FIG. 5 is a diagram depicting the pressure-sensitive type touch panel 500 viewed from the side and FIG. 6 is a diagram depicting the pressure-sensitive type touch panel 500 viewed from the front. As depicted in FIG. 5, the touch panel 500 includes, on the display 411, a touch sensor 501 that detects the strength of touch of the object. The touch sensor 501 can detect, at least by two levels (equal to or less than the given strength, and larger than the given strength), the strength of touch by the object.

As depicted in FIG. 6, the touch sensor 501 detects a position on the touch panel 500 at which a finger F of the user comes in contact with the panel. When the contact position of the finger F of the user is detected, the touch sensor 501 detects the position P, at which the finger F of the user touches the panel, as a coordinate (X, Y) where for example the X-coordinate is taken in the horizontal direction of the touch panel 500 and the Y-coordinate is taken in the vertical direction of the touch panel 500.

Figure 7:
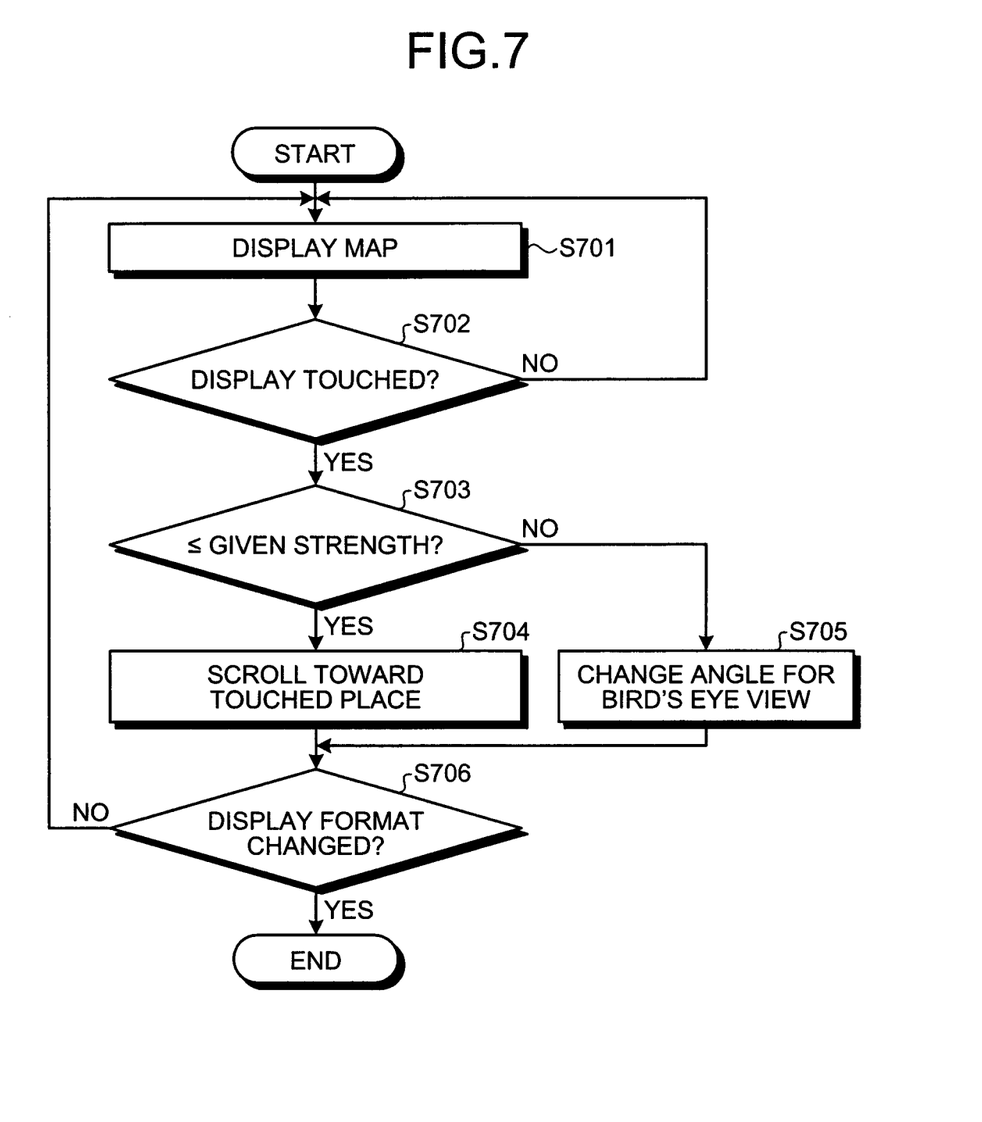
FIG. 7 is a flowchart illustrating a process of the map display by the navigation apparatus.

A process of the map display by the navigation apparatus 400 is explained. FIG. 7 is a flowchart illustrating the process of the map display by the navigation apparatus. According to the flowchart of FIG. 7, the navigation apparatus 400 displays on the display 411 a map in which a given point is determined to be a reference point (step S701). The given point is, for example, a point of the current position of the vehicle or a point designated by the user. The reference point may be a central point of the displayed map or another point (a little lower than the central point of the display 411). The angle for bird's eye view of the bird's eye view displayed in step S701 is, for example, an angle selected by default, an angle designated by the user, or an angle designated at the last display of the map.

The navigation apparatus 400 determines whether an object (for example, a hand of the user) has touched the display 411 (step S702). Until the object touches the display (step S702: NO), the process returns to step S701 and the map remains displayed. When the object touches the display (step S702: YES), it is determined whether the strength of touch is at most a given strength (step S703). The strength of touch is determined based on the detection by the touch sensor as explained with reference to FIG. 5 and FIG. 6.

If the strength of touch is at most the given strength (step S703: YES), the navigation apparatus 400 scrolls the map in a direction toward the contact (step S704). The direction toward the contact is, for example, a direction from the reference point on the map toward a point where the object has touched the display 411.

If the strength of touch is larger than the given strength (step S703: NO), the navigation apparatus 400 changes the angle for bird's eye view of the displayed bird's eye view (step S705). Further, for example, if the point where the object has touched the display is farther in the distance with respect to the reference point on the display, the angle for bird's eye view is reduced. On the other hand, if the point where the object has touched the display is in the forefront of the display with respect to the reference point, the angle for bird's eye view is increased. When the angle for bird's eye view is reduced, the bird's eye view displayed on the display 411 approaches a view (driver's view) seeing the reference point from another point (vantage point) on the ground. When the angle for bird's eye view is increased, the bird's eye view displayed on the display 411 approaches a view (plan view) seeing the reference point from directly above.

Until a view other than the bird's eye view is displayed on the display 411 (step S706: NO), the navigation apparatus 400 continues the process returning to step S701. When a view is switched from the bird's eye view (step S706: YES), the process according to the flowchart is terminated.

Figure 8:
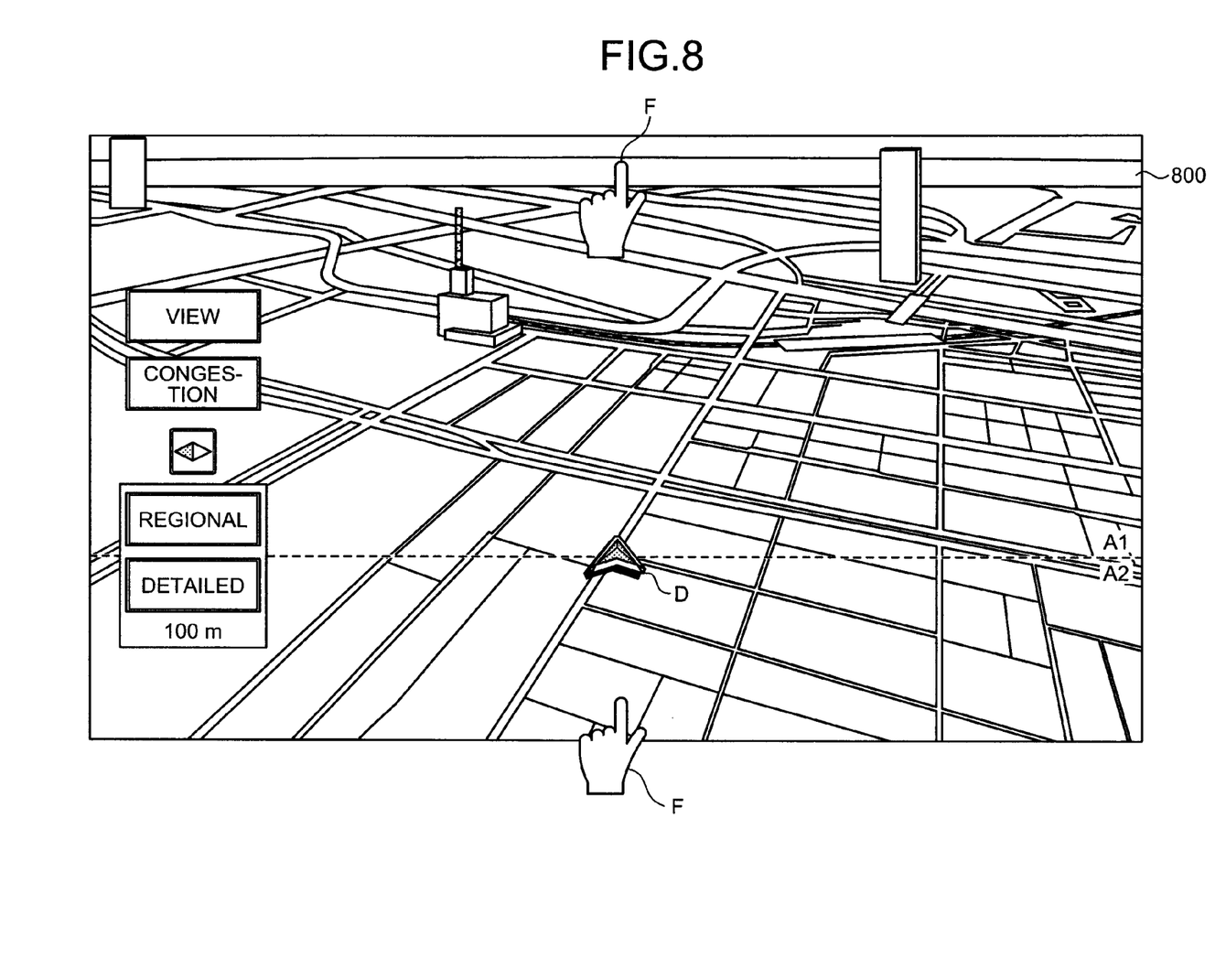
FIG. 8 is a diagram depicting one example of a displayed map.
Figure 9:
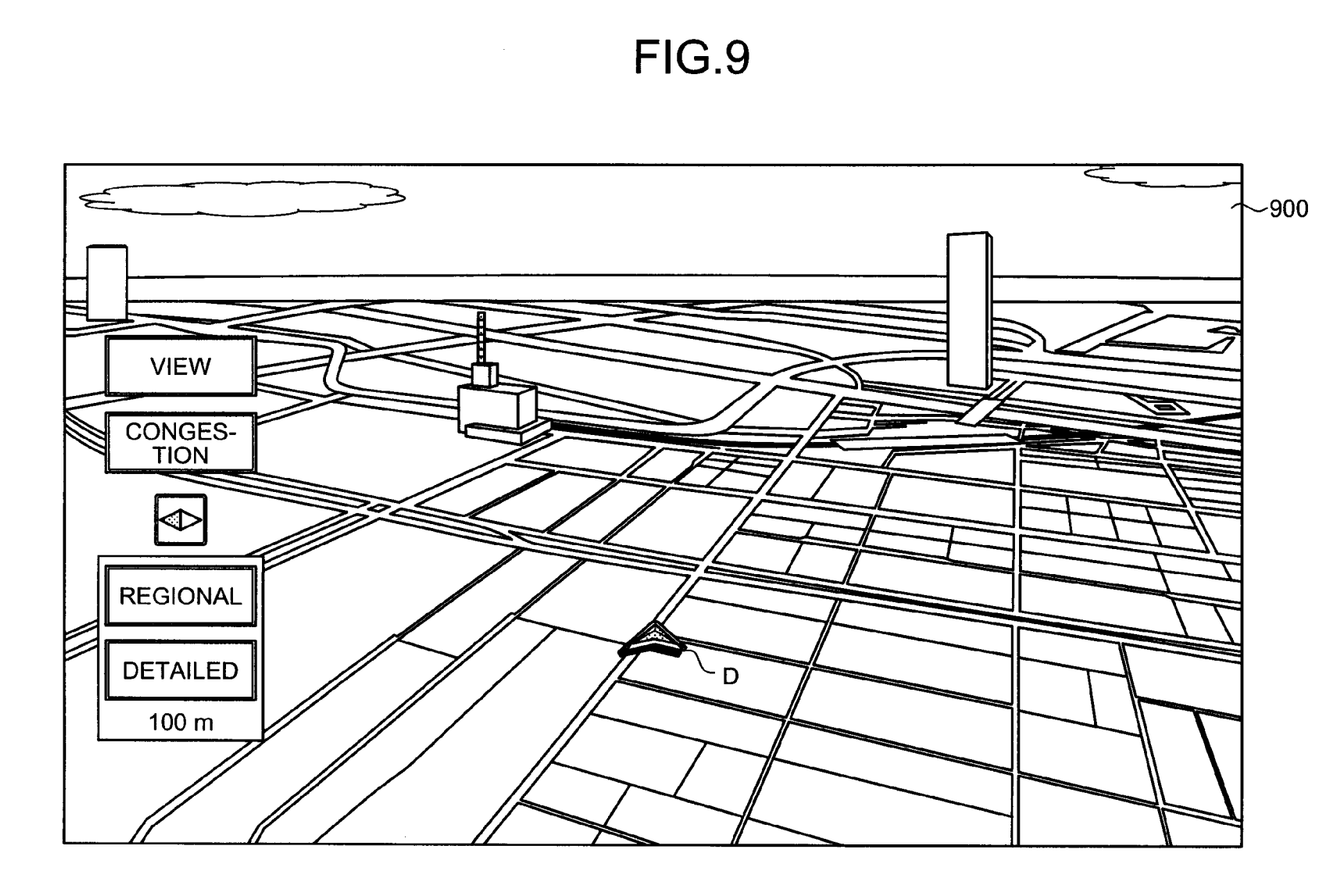
FIG. 9 is a diagram depicting one example of a displayed map.
Figure 10:
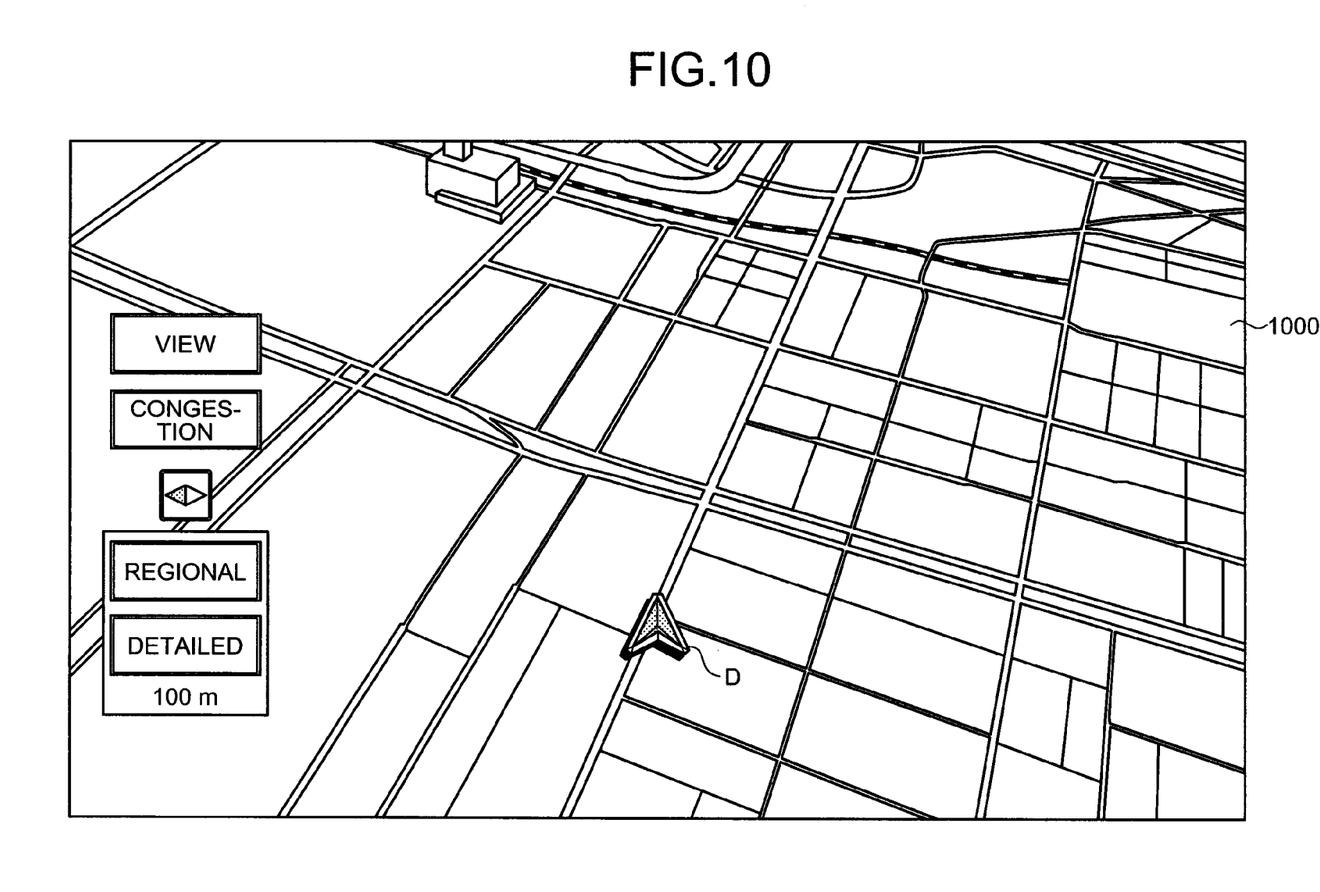
FIG. 10 is a diagram depicting one example of a displayed map.

FIG. 8 through FIG. 12 are explanatory diagrams depicting one example of a displayed map. FIG. 8 depicts a bird's eye view 800 for which a reference point D on the ground is viewed at a given angle for bird's eye view. The reference point D is the current position of the vehicle and an icon indicating the current position of the vehicle is provided. When the user wishes to change the angle for bird's eye view of the bird's eye view 800, the user presses the surface of the display 411 hard (larger than the given strength). If a region A1, which is farther in the distance with respect to the reference point D, is pressed, the angle for bird's eye view is reduced and the bird's eye view displayed on the display 411 becomes a bird's eye view 900 of FIG. 9. In the bird's eye view 900 of FIG. 900, the vantage point comes closer to the ground compared to the bird's eye view 800 of FIG. 8. On the other hand, if a region A2, which is in the forefront with respect to the reference point D, is pressed in FIG. 8, the angle for bird's eye view increases and the bird's eye view displayed on the display 411 becomes the angle for bird's eye view 1000 of FIG. 10. In the bird's eye view 1000 of FIG. 10, a vantage point leaves the ground looking down at the ground from far above compared to the bird's eye view 800 of FIG. 8.

In the above example, the current position of the vehicle is taken as the reference point D but the reference point D is not limited to this point. For example, the center of the display screen may be the reference point D or an icon (cross-shaped icon) in FIG. 11 and FIG. 12 described later may be the reference point D. The navigation apparatus 400, when displaying the bird's eye view viewed from an oblique direction, may set the reference point D at the center of a region displaying the ground. In this case, a ratio of the region displaying the ground in the entire screen changes every time the angle for bird's eye view is changed (as the angle for bird's eye view gets smaller, the area of the sky increases and the area of the ground decreases) and thus the reference point D moves simultaneously. In addition, in this case, the navigation apparatus 400 may be configured to not change the angle for bird's eye view even if the region of the sky is pressed hard. The user feels more clearly that when the surface of the ground is pressed, the surface is inclined so that an operation of changing the angle for bird's eye view can be performed intuitively.

The angle for bird's eye view has a maximum and a minimum. Even if the region A1, which is farther in the distance with respect to the reference point D, is pressed hard when the angle for bird's eye view is at the minimum (for example, almost equal to 0°), the operation is canceled because the angle does not become smaller. Similarly, even if the region A2, which is in the forefront with respect to the reference point D, is pressed hard when the angle for bird's eye view is at the maximum (for example, 90°), the operation is canceled because the angle does not become larger.

Figure 11:
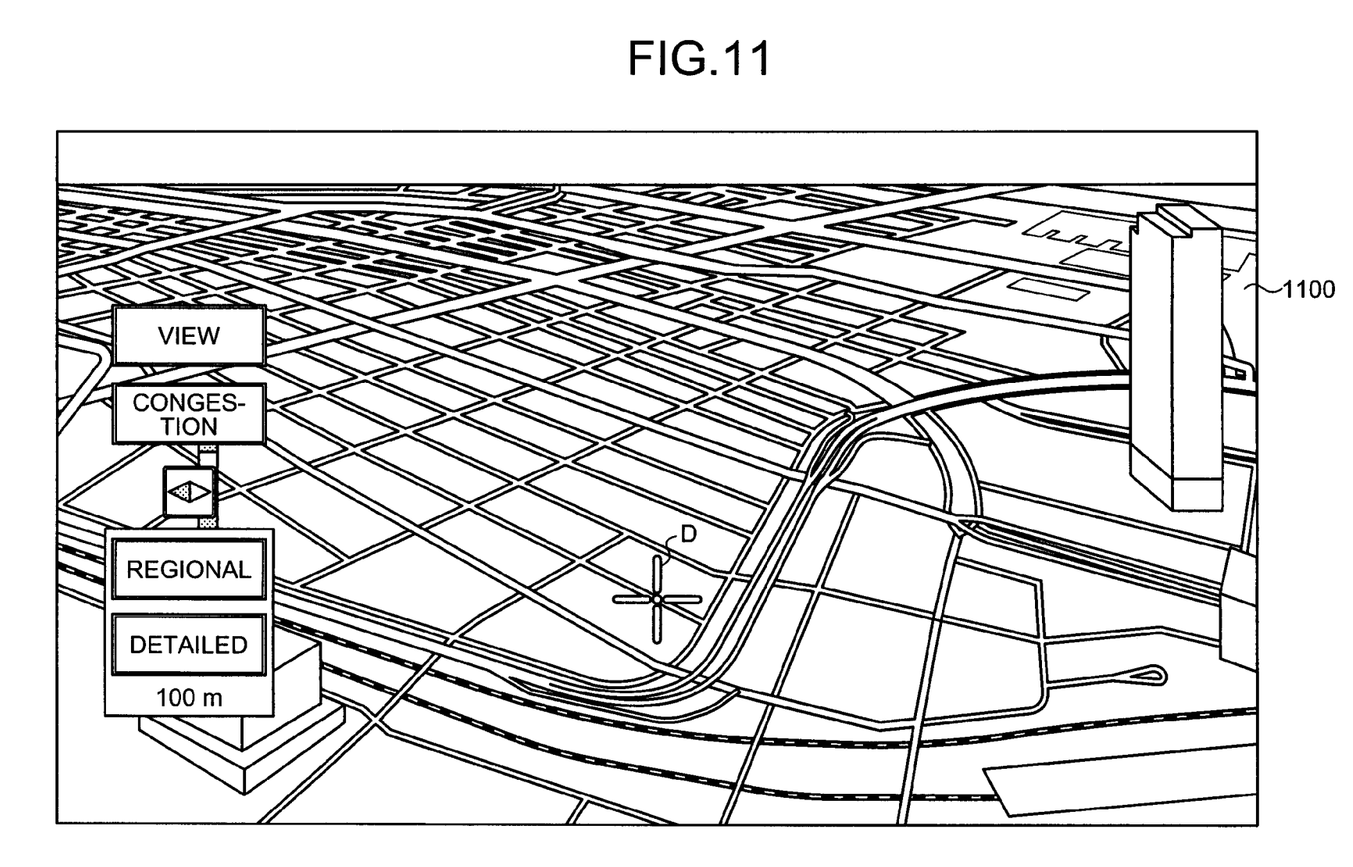
FIG. 11 is a diagram depicting one example of a displayed map.
Figure 12:
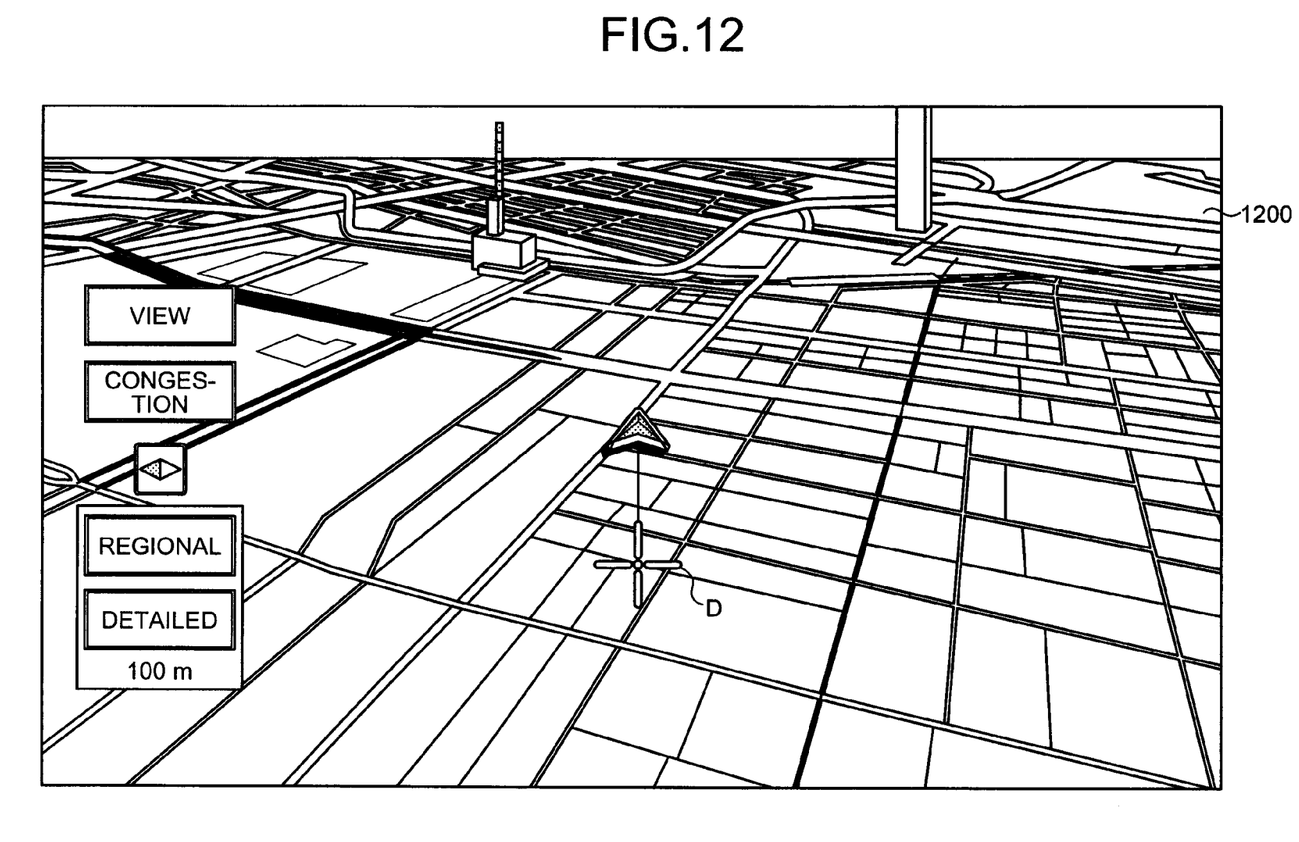
FIG. 12 is a diagram depicting one example of a displayed map.

When the user wishes to change (scroll) the displayed area of the angle for bird's eye view 800 in FIG. 8, the user presses the surface of the display 411 softly (not larger than the given strength). In this case, if the region A1, which is farther in the distance with respect to the reference point D, is pressed, the map is scrolled toward the side farther in the distance with respect to the reference point D as depicted in a bird's eye view 1100 of FIG. 11. In FIG. 11, the reference point D is not the current position of the vehicle and an icon indicating the reference point is displayed. If the region A2, which is in the forefront with respect to the reference point D, is pressed in FIG. 8, the map is scrolled toward the side in the forefront with respect to the reference point D as depicted in an angle for bird's eye view 1200 of FIG. 12. Also in FIG. 12, the reference point D is not the current position of the vehicle an icon indicating the reference point is present far from an icon indicating the current position of the vehicle.

When the user continues touching the display 411, in other words when the user pushes the display 411 for a while, the navigation apparatus 400 continues the process selected based on the strength of touch (change of the angle for bird's eye view or scrolling). For instance, the region A1 of the bird's eye view 800 in FIG. 8 is pressed hard for a while, those displayed on the display 411 is changed such that the angle for bird's eye view is gradually reduced until the pressing ends or the angle for bird's eye view reaches the minimum. When the region A1 of the bird's eye view 800 in FIG. 8 is pressed softly for a while, the map continues to scroll toward the side in the forefront with respect to the reference point D until the pressing ends.

Even when the strength of touch is changed while the display 411 continues to be pressed as above, the navigation apparatus 400 continues the started process. For instance, when the strength of touch increases and exceeds the given strength while the display 411 has been kept weakly pressed (while the scrolling is performed), the navigation apparatus 400 continues the scrolling. In these cases where the strength of touch increases during the scrolling, the navigation apparatus 400 may accelerate the scrolling of the map. This is because a user has a tendency to press the display 411 hard when the user feels that the current speed of the scrolling is slow. The changing of the scroll speed based on the strength of touch enables an intuitive scrolling operation.

Further, the changing speed of the angle for bird's eye view or the scroll speed may be changed depending on the distance between the reference point and the point where the object has touched the display 411. For example, as the distance between the reference point and the point where the object has touched the display 411 increases, the changing speed of the angle for bird's eye view or the scroll speed increases. In this way, when the user wishes to change the angle for bird's eye view greatly or see a map that is far from the currently displayed area, display is efficiently changed.

As explained above, the navigation apparatus 400 determines the strength of touch of the object on the display 411, scrolls a map if the strength of touch is at most the given strength, and changes the angle for bird's eye view if the strength of touch is larger than the given strength. As a result, an interface for changing the angle for bird's eye view of the bird's eye view can be omitted and the display region of the display 411 or other devices can be used effectively.

Further, the navigation apparatus 400 can receive two kinds of input that merely depend on how hard the display 411 is touched. Changing the strength of touch on the display 411 is easy compared with other operations (for instance, pushing two buttons selectively). As a result, even the devices like the navigation apparatus 400 mounted in the moving object such as a vehicle can be operated without affecting the movement of the vehicle.

Further, the navigation apparatus 400 continues the scrolling or the change of the angle for bird's eye view while the object continues to touch the display 411. As a result, operations such as a large change of a map's displayed region or of the angle for bird's eye view, and a continuous change of a map's displayed region or of the angle for bird's eye view can be easily performed. Furthermore, the navigation apparatus 400 accelerates the scrolling when the strength of touch exceeds the given strength during the scrolling of a map. This is because a user tends to press the display 411 hard when the user feels that the scrolling is slow. Changing the speed of the scroll based on the strength of touch enables an intuitive control of the scrolling.

Furthermore, when the angle for bird's eye view is changed, the navigation apparatus 400 reduces the angle for bird's eye view if the object touches a region farther in the distance with respect to the reference point, and increases the angle for bird's eye view if the object touches a region in the forefront with respect to the reference point. As a result, the angle for bird's eye view can be changed intuitively and the user can easily adjust the angle for bird's eye view to a desirable angle.

Furthermore, when the angle for bird's eye view is changed, the navigation apparatus 400 accelerates the changing speed of the angle for bird's eye view in proportion to the distance between the reference point and the point where the object touches the touch panel. As a result, display is efficiently changed when the user wishes to largely change the angle for bird's eye view.

The map display method explained in the present embodiments can be implemented by a computer, such as a personal computer and a workstation, executing a program that is prepared in advance. The program is recorded on a computer-readable recording medium such as a hard disk, a flexible disk, a CD-ROM, and an MO, a DVD, and is executed by being read out from the recording medium by a computer. The program can be a transmission medium that can be distributed through a network such as the Internet.

EXPLANATIONS OF LETTERS OR NUMERALS 100 map display apparatus
101 display
102 touch panel
103 determining unit
104 display controller

The invention claimed is:

1. A map display apparatus comprising:
a display that displays a map viewed at a given angle for a bird's eye view with respect to the ground;
a touch panel that is disposed on the display;
a determining unit that determines strength of touch of an object on the touch panel;
a display controller that controls a display format of the map displayed on the display, based on a result of determination by the determining unit, wherein
the display displays the map, around a reference point and with the ground tilted on the display at the angle for the bird's eye view in which the ground is viewed from above,
the display controller scrolls the map when the strength of touch is at most a given strength, and changes the angle for bird's eye view when the strength of touch exceeds the given strength, and
the display controller, when changing the angle for bird's eye view, i) reduces the angle for bird's eye view when the object touches a region of the touch panel displaying a region of the map farther in distance with respect to the reference point, and ii) increases the angle for bird's eye view when the object touches a region of the touch panel displaying a region of the map in a forefront with respect to the reference point.

2. The map display apparatus according to claim 1, wherein the display controller continues to scroll the map or change the angle for the bird's eye view while the object continues to touch the touch panel.

3. The map display apparatus according to claim 2, wherein the display controller accelerates scroll speed when the strength of touch exceeds the given strength during the scroll of the map.

4. The map display apparatus according to claim 1, wherein the display controller, when changing the angle for the bird's eye view, accelerates a changing speed of the angle for bird's eye view in proportion to the distance between the reference point and a point where the object touches the touch panel.

5. A map display method for a map display apparatus including a display and a touch panel disposed on the display, the method comprising:
displaying on the display a map viewed at a given angle for a bird's eye view with respect to the ground;
determining strength of touch of an object on the touch panel;
controlling a display format of the map displayed on the display, based on a determination result obtained at the determining, wherein
the display displays the map, around a reference point and with the ground tilted on the display at the angle for the bird's eye view in which the ground is viewed from above,
at the controlling, the map is scrolled if the strength of touch is at most a given strength, and the angle for bird's eye view is changed if the strength of touch is larger than the given strength, and
when changing the angle for bird's eye view, i) reducing the angle for bird's eye view when the object touches a region of the touch panel displaying a region of the map farther in distance with respect to the reference point, and ii) increasing the angle for bird's eye view when the object touches a region of the touch panel displaying a region of the map in a forefront with respect to the reference point.

6. A non-transitory, computer-readable recording medium storing therein a map display program causing a computer to execute:
displaying on the display a map viewed at a given angle for a bird's eye view with respect to the ground;
determining strength of touch of an object on the touch panel;
controlling a display format of the map displayed on the display, based on a determination result obtained at the determining, wherein
the display displays the map, around a reference point and with the ground tilted on the display at the angle for the bird's eye view in which the ground is viewed from above,
at the controlling, the map is scrolled if the strength of touch is at most a given strength, and the angle for bird's eye view is changed if the strength of touch is larger than the given strength, and
when changing the angle for bird's eye view, i) reducing the angle for bird's eye view when the object touches a region of the touch panel displaying a region of the map farther in distance with respect to the reference point, and ii) increasing the angle for bird's eye view when the object touches a region of the touch panel displaying a region of the map in a forefront with respect to the reference point.

* * * * *